(12) United States Patent
Reiner

(10) Patent No.: US 6,213,402 B1
(45) Date of Patent: Apr. 10, 2001

(54) DATA CARRIER FOR CONTACTLESS RECEPTION OF DATA AND ENERGY, AND A METHOD OF OPERATING SUCH A DATA CARRIER

(75) Inventor: Robert Reiner, Neubiberg (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/251,862

(22) Filed: Feb. 17, 1999

(30) Foreign Application Priority Data

Feb. 17, 1998 (DE) .................................. 98102790

(51) Int. Cl.⁷ .................................................. G06K 19/06
(52) U.S. Cl. .................................................. 235/492
(58) Field of Search ...................... 235/492, 383, 235/384, 385, 438, 375, 451; 902/380, 2; 340/825.32, 825.36

(56) References Cited

U.S. PATENT DOCUMENTS

| 4,605,844 | * | 8/1986 | Haggan | 235/380 |
| 4,827,111 | * | 5/1989 | Kondo | 235/380 |
| 4,906,828 | * | 3/1990 | Halpern | 235/379 |
| 5,309,482 | * | 5/1994 | Wright et al. | 375/103 |
| 5,930,304 | * | 7/1999 | Hollenbeck et al. | 375/316 |

FOREIGN PATENT DOCUMENTS

| 2751148 | | 1/1998 | (FR) . | |
| 40-4038588 | * | 2/1992 | (JP) | 235/492 |
| 40-4054688 | * | 2/1992 | (JP) | 235/492 |
| 40-4074290 | * | 3/1992 | (JP) | 235/492 |
| 40-4171592 | * | 6/1992 | (JP) | 235/492 |

\* cited by examiner

*Primary Examiner*—Michael G. Lee
*Assistant Examiner*—Diane I. Lee
(74) *Attorney, Agent, or Firm*—Herbert L. Lerner; Laurence A. Greenberg; Werner H. Stemer

(57) ABSTRACT

A data carrier, such as a smart card, has a coil for contactless reception of data and energy and for contactless transmission of data. A logic circuit processes the received, demodulated and decoded data. A first demodulator for demodulating received 100%-ASK-modulated signals and a second demodulator for demodulating received ASK-modulated signals with a modulation depth of less than 100% are provided. The second demodulator is triggered by the first demodulator in such a way that on reception of a 100%-ASK-modulated signal, it is deactivated by the first demodulator.

9 Claims, 3 Drawing Sheets

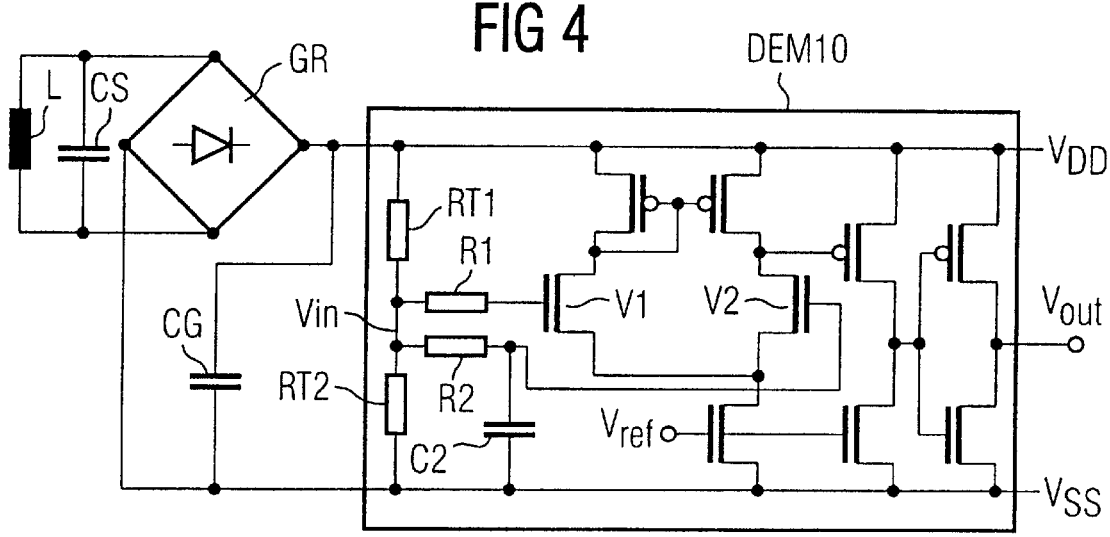
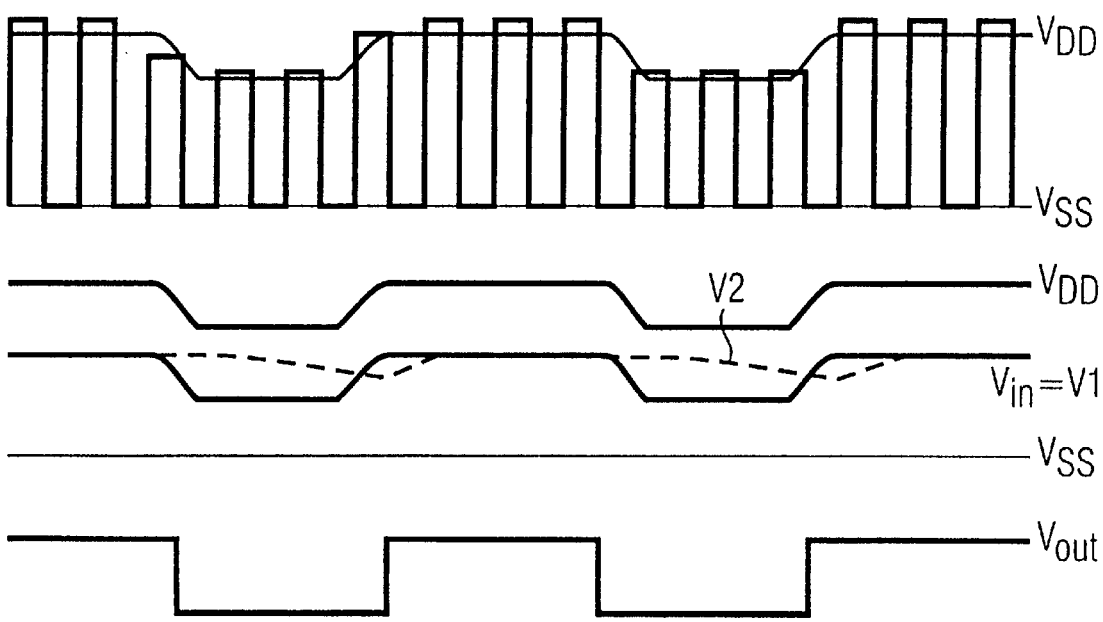

DATA CARRIER FOR CONTACTLESS RECEPTION OF DATA AND ENERGY, AND A METHOD OF OPERATING SUCH A DATA CARRIER

BACKGROUND OF THE INVENTION

Field of the Invention

The invention relates to a data carrier with a coil for communication, i.e., for the contactless reception of data and energy and the contactless transmission of data. The data carrier has a logic circuit for processing and storing the received, demodulated, and decoded data.

Currently, such data carriers are used primarily as so-called contactless smart cards (chip cards), or, if in addition to the contactless interface they are also provided with terminal contacts, as so-called combination cards or dual interface cards. However, their use is not restricted to the form and shape of a card, since they have also already been proposed in wristwatches and hang tags, for instance for ski lifts.

In ISO Standard 14443 for the contactless interface of such smart cards, two different kinds of modulation for the data, transmitted from a read/write station to a card, are listed. These are pure blanking of the data carrier, which is also known as on-off keying and has the working title ASK100%, and Amplitude Shift Keying (ASK) modulation with a modulation depth of 5% to 15%, with the working title ASK10%. The terms "ASK10%" and "10%-ASK-modulated signals" as used herein refers to a type of modulation as defined by ISO Standard 14443.

Different kinds of bit coding are associated with these types of modulation. For instance, with ASK100%, pulse position coding is employed. The type of modulation and bit coding of the data, sent from a smart card to a read-write station, may also be different.

ASK100% has the advantage of being easy to demodulate, since all that is required is a blanking gap detection circuit. However, during the blanking gap, the clock pulse is missing, and relatively major sidebands occur in the frequency spectrum.

ASK10%, by comparison, makes a continuous clockline possible and entails a substantially lower level of sidebands but is difficult to demodulate, because on the one hand the distance between the card and the read-write station can fluctuate greatly, the circuits on the side of the card have a severely fluctuating current consumption, and the circuitry options for the demodulator circuit are limited, since no sufficiently constant, adequately high voltage supply is available.

SUMMARY OF THE INVENTION

It is accordingly an object of the invention to provide a data carrier for the contactless reception of data and energy, and a method of operating such a data carrier, which overcomes the above-mentioned disadvantages of the heretofore-known devices and methods of this general type and which allows both types of modulation to be received and furnishes unambiguous data.

With the foregoing and other objects in view there is provided, in accordance with the invention, a data carrier, in particular a smart card, comprising:

a coil for contactless data and energy reception and for contactless data transmission;

a logic circuit connected to the coil, the logic circuit processing received, demodulated and decoded data;

a first demodulator for demodulating 100%-ASK-modulated signals received by the data carrier;

a second demodulator connected to the first demodulator for demodulating ASK-modulated signals received by the data carrier having a modulation depth of less than 100%;

the second demodulator being triggered by the first demodulator such that, on receiving a 100%-ASK-modulated signal, the second demodulator is deactivated by the first demodulator.

In other words, the two demodulators can demodulate 100%-ASK- or 10%-ASK-modulated signals, respectively. When a 100%-ASK-modulated signal is received, that is, when the first blanking gap is received, the 10%-ASK demodulator is deactivated, since while it can receive 100%-ASK-modulated signals, nevertheless the ensuing decoding produces completely incorrect results. The data carrier according to the invention accordingly assures that unambiguous demodulation and decoding will always take place.

In accordance with an added feature of the invention, a status register is connected to the first and second demodulators via control lines. The status register indicates to the logic circuit which of the first and second demodulators is active at a given time. The status register is triggerable by the demodulators to indicate which demodulator is active. The status register can be polled by the logic circuit, for instance via a common bus.

In accordance with an additional feature of the invention, a voltage supply device is connected via a control line to the logic circuit. The voltage supply device is adjustable to an optimum depending on the type of modulation of the signal being received.

In accordance with another feature of the invention, the logic circuit has a reset input, and the first demodulator has an output connected to the status register for triggering the status register. A switch is connected between the output of the first demodulator and the reset input of the logic circuit. The switch is connected to and driven by the second demodulator.

The output of the 100%-ASK demodulator that indicates the reception of a blanking gap thus can be connected, after a 10%-ASK data bit is received, with the reset input of the logic circuit of the data carrier, so that the entire data carrier is reset, since the occurrence of a blanking gap in a 10%-ASK-modulated signal is an indication of an error or manipulation.

With the above and other objects in view there is also provided, in accordance with the invention, a method of operating the above-described data carrier. The method comprises deactivating the second demodulator with the first demodulator upon receiving a first blanking, and deactivating the first demodulator with the second demodulator no earlier than after receiving a first data bit. In other words, after the first data bit of a 10%-ASK-modulated signal, the 100%-ASK demodulator is deactivated. This provision assures an unambiguous functional state of the circuit.

In accordance with another feature of the invention, the second demodulator is deactivated by the first demodulator upon receiving a first blanking, and when a blanking occurs during a reception of an ASK-modulated signal with a modulation depth of less than 100%, the logic circuit is reset.

In accordance with a concomitant feature of the invention, a voltage supply device is adjusted to optimal operation with the logic circuit as a function of a state of the status register.

Since the power transmission when a 10%-ASK-modulated signal is received differs substantially from that when a 100%-ASK-modulated signal is received, it is advantageous to trigger the voltage supply device with the logic circuit as a function of the state of the status register. This attains an optimal adjustment. As an alternative, the triggering can also be done by the demodulators.

Other features which are considered as characteristic for the invention are set forth in the appended claims.

Although the invention is illustrated and described herein as embodied in a data carrier for contactless reception of data and energy, and method for operating such a data carrier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a more detailed schematic of a circuit for a 10%-ASK demodulator; and

FIG. 5 is a three-layer graph showing voltage courses for the circuit illustrated in FIG. 4.

DESCRIPTION OF THE PREFERRED EMBODIMENTS

Figure 1:
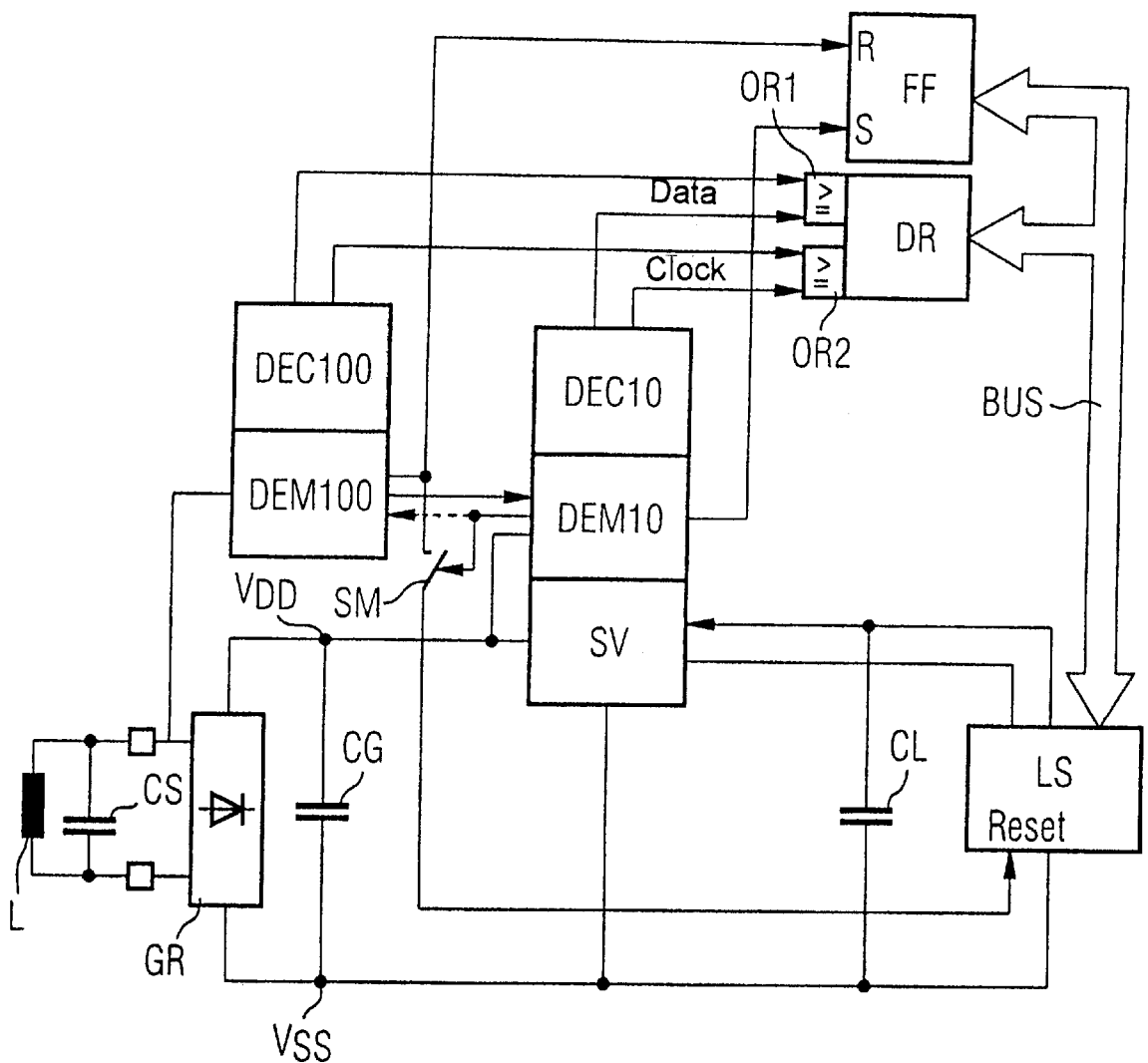
FIG. 1 is a schematic diagram of a basic circuit for a data carrier according to the invention.

Referring now to the figures of the drawing in detail and first, particularly, to FIG. 1 thereof, there is seen an oscillator circuit comprising a coil L and a capacitor CS connected to the input of a rectifier circuit GR. The output of the rectifier circuit GR is connected to a smoothing capacitor CG, at whose terminals the supply voltages $V_{DD}$ and $V_{SS}$ can be picked up. The supply voltages $V_{DD}$, $V_{SS}$ are delivered to a voltage supply device SV, which in particular includes closed-loop control members, so that on the output side it can furnish as constant as possible a voltage supply for the downstream circuits. The output of the voltage supply device SV, in the circuit of FIG. 1, is connected for example to a logic circuit LS. However, it is understood that any other circuit units are also acted upon by the supply voltage.

The basic circuit also has a first demodulator DEM100 for demodulating 100%-ASK-modulated signals. It is acted upon by the high-frequency signal applied to the oscillator circuit L, CS. The first demodulator DEM100 is connected to a first decoder circuit DEC100, which decodes the demodulated signal and delivers the data derived therefrom to the first input of a first OR gate OR1 and the clock signal derived therefrom to the first input of a second OR gate OR2.

The first demodulator DEM100 also has a first output, which is connected to a first input R of a status register FF embodied as a flip-flop.

As the signal to be demodulated, the rectified and smoothed but not yet regulated supply voltage $V_{DD}$ is delivered to the input of a second demodulator DEM10 for demodulating 10%-ASK-modulated signals. It is understood that the reference potential $V_{SS}$ is applied to the second demodulator DEM10, as to all the other parts of the circuit. This is not explicitly shown in FIG. 1 for the sake of simplicity.

The second demodulator DEM10 is connected to a second decoding circuit DEC10, whose data output is connected to the second input of the first OR circuit OR1 and whose clock output is connected to the second input of the second OR circuit OR2. One output of the second demodulator DEM10 is connected to a second input S of the status register FF.

The first demodulator DEM100 has a further output, which is connected to a deactivating input of the second demodulator DEM10. In principle, instead of the further output of the first demodulator DEM100, its first output connected to the status register FF could also be connected to the deactivating input of the second demodulator DEM10.

In the same way, the second demodulator DEM10 has an output which either, as represented by dashed lines, is connected to a deactivating input of the first demodulator DEM100, or as shown by solid lines, triggers a switch means SM, which connects the first output, connected to the status register FF, of the first demodulator DEM100 to a reset input of the logic circuit LS.

The two OR gates OR1, OR2 are connected to a data register DR, into which the received data are written by means of the clock signal derived from the received signal. The clock signal is understood also to be available to other parts of the circuit, such as to the logic circuit LS. The status register FF, the data register DR, and the logic circuit LS are for instance connected to one another via a bus, as shown in FIG. 1.

One output of the logic circuit LS is connected to one input of the voltage supply device SV. Depending on the state of the status register FF and thus on the type of modulation received, the voltage supply device SV can thus be adjusted optimally by the logic circuit LS.

The function of a 100%-ASK demodulator DEM100 will be described and explained below in terms of an exemplary embodiment in conjunction with FIGS. 2 and 3. Circuit elements identical to those already shown in FIG. 1 are provided with the same reference numerals and symbols.

The 100%-ASK demodulator DEM100 is formed substantially by three series-connected CMOS inverters I1, I2, I3; the middle inverter I2 is embodied with differently conductive transistors T1, T2. A resistor R also precedes the N-channel transistor T2 of the second inverter I2. A capacitor C is connected in parallel to the series circuit comprising the resistor R and the load path of the n-channel transistor T2. The input of the first inverter I1 is acted upon by the high-frequency signal V applied to the oscillator circuit L, CS, while the output of the third inverter I3 forms the demodulated output signal V4.

Figure 3:
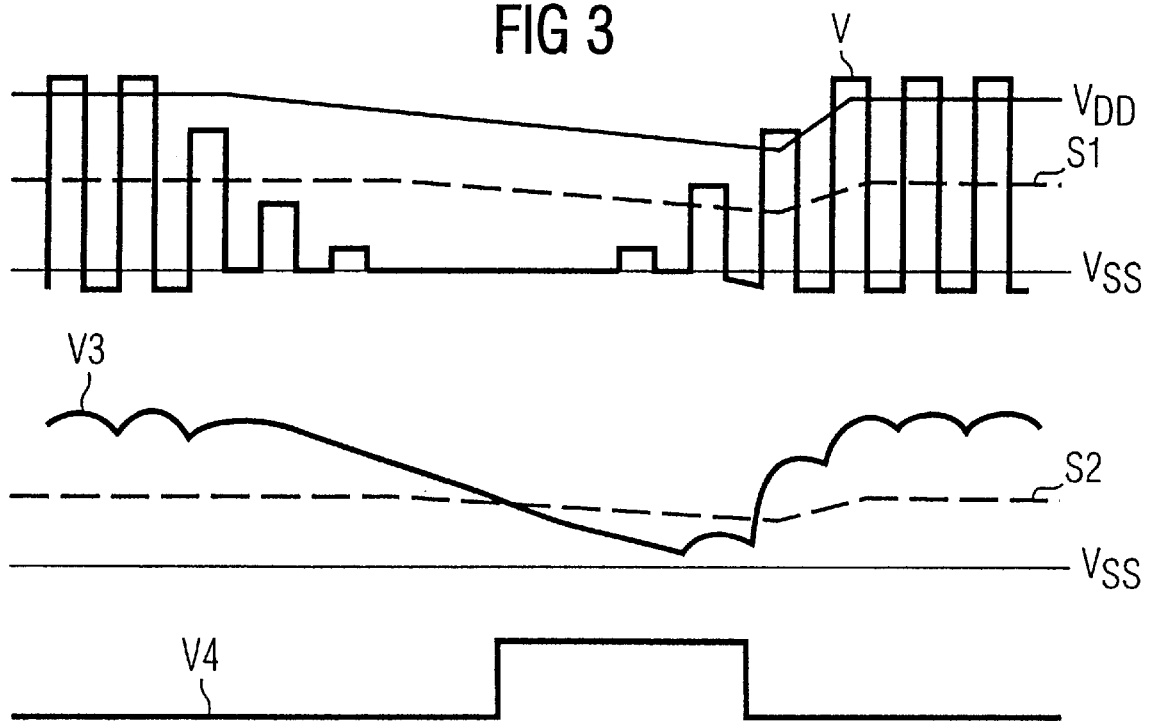
FIG. 3 is a three-layer graph showing voltage courses for the circuit illustrated in FIG. 2.

In the upper part of FIG. 3, the high-frequency 100%-ASK-modulated signal V is shown, as it is applied to the oscillator circuit L, CS. In the example shown, a blanking gap is shown. In the upper part of FIG. 3, the basic course of the supply voltages $V_{DD}$ and $V_{SS}$, derived from this signal, is also shown. As a function of these supply voltages $V_{DD}$, $V_{SS}$, a switching threshold S1 of the first inverter I1 is obtained, which is represented by dashed lines. In the middle part of FIG. 3, the course of the voltage V3 at the capacitor C is shown and, also in dashed lines, the course of the switching threshold S2 of the second inverter I2 referred to the reference potential $V_{SS}$. From the relative course of the voltage V3 with respect to the switching threshold S2, the course of the output signal V4 of the third inverter I3 shown in the lower part of FIG. 3 is obtained.

Figure 2:
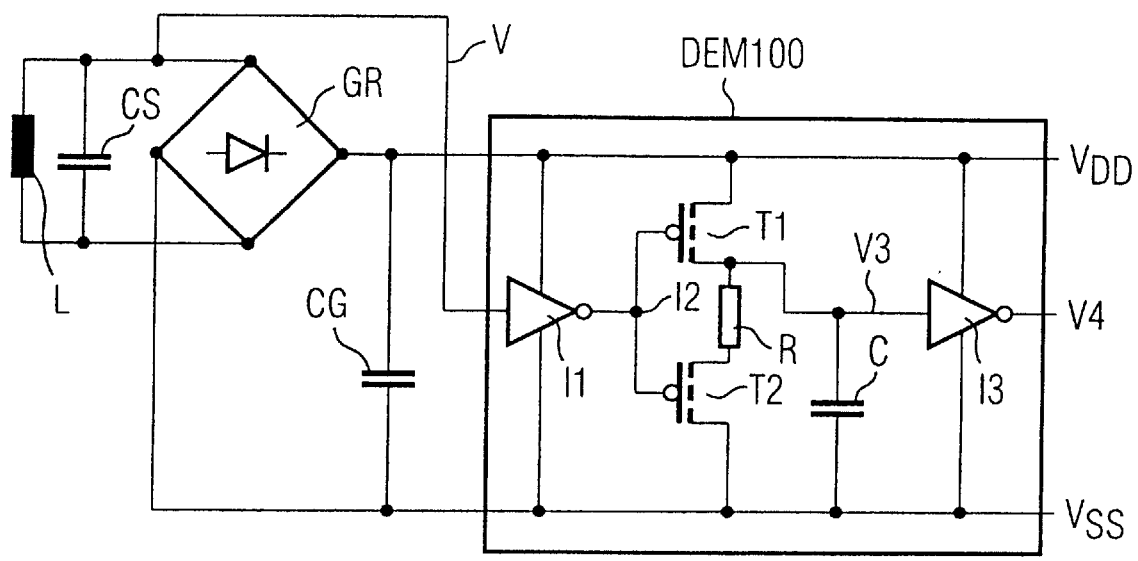
FIG. 2 is a more detailed schematic of a circuit for a 100%-ASK demodulator.

As can be learned from FIG. 3, it is possible with a demodulator circuit DEM100 of FIG. 2 to detect a blanking gap of the kind shown in the upper part of FIG. 3, with a delay that is adjustable by the resistor R and the capacitor C. For coding the data to be transmitted from a read-write station to the data carrier, pulse position coding is currently used in 100%-ASK modulation; that is, the information from the position of the blanking gap within a time slot to be evaluated is definitive for the information (see ISO/IEC 14443-2). For decoding, in the first decoding circuit DEC100, the clock pulses derived from the high-frequency oscillation can be counted and evaluated from the beginning of the time slot to the beginning of the blanking gap.

An exemplary embodiment of a 10%-ASK demodulator DEM10 is shown in FIG. 4. Once again, circuit elements identical to those already shown in FIG. 1 are identified by the same reference numerals.

The 10%-ASK or second demodulator DEM10 is formed by a differential amplifier, known to one skilled in the art, with a downstream push-pull output driver and an inverter downstream of that. The current source of the differential amplifier and the pole transistor of the output driver are acted upon by a reference voltage $V_{REF}$, which is derived from the supply voltages $V_{DD}$, $V_{SS}$ in circuit elements not shown.

A signal V1, which is derived from the supply voltages $V_{DD}$, $V_{SS}$ via a resistor R1 and a voltage divider RT1, RT2 is applied to the first input of the differential amplifier. A signal V2, which is also derived from the supply voltages $V_{DD}$, $V_{SS}$ via the voltage divider RT1, RT2 is applied to the second input of the differential amplifier, but in addition is carried via a low-pass filter formed by a resistor R2 and a capacitor C2. As a result, the changes in the amplitude of the supply voltage $V_{DD}$ that occur because of the amplitude modulation are applied directly to the first input of the differential amplifier and with a delay to the second input of the differential amplifier. In this way, amplitude fluctuations can be detected.

The various voltage courses are shown in FIG. 5, from which the function of the second demodulator DEM10 is self-explanatory. Thus it can be seen that the modulation in the amplitude of the high-frequency carrier signal applied to the oscillator circuit L, CS is duplicated in a corresponding amplitude fluctuation of the supply voltage $V_{DD}$. This voltage is applied to the inputs of the differential amplifier of the second demodulator DEM10 via the voltage divider RT1, RT2 and the resistor R2 and the low-pass filter R2, C2, respectively.

The result of this is an output signal $V_{OUT}$ of the kind shown in the lower part of FIG. 5.

As can be seen from a comparison of FIGS. 2 and 3 with FIGS. 4 and 5, a 10%-ASK modulation cannot be detected by the first, 100%-ASK demodulator DEM100; that is, in this case the first demodulator DEM100 will not respond. The second demodulator DEM10, however, will further output signals to the second decoder DEC10, which will write correspondingly decoded data in the data register DR. By means of a signal from the second demodulator DEM10, the status register FF is put into a state from which the logic circuit LS can detect which type of modulation is involved. In an advantageous feature of the invention, by controlling the logic circuit LS, the voltage supply device SV can be adjusted to an optimal value.

The second demodulator DEM10 can either deactivate the first demodulator DEM100, or switch one output of this first demodulator DEM100, which indicates that a blanking gap has been received, to a reset input of the logic circuit LS via a switch means SM. As a result, any possible error or misuse can advantageously be effectively prevented.

However, deactivation of the first demodulator DEM100 or actuation of the switch means SM cannot be allowed to take place until it has been ascertained that a genuine ASK10% signal is involved, rather than some malfunction or the onset of an ASK100% signal, or in other words at the earliest once the first data bit of a 10%-ASK modulation has been completely received. Not until then is it assured that the first demodulator DEM100 will no longer respond, because a blanking gap cannot possibly be involved. It may in fact be advantageous to wait until several bits have been received, for instance one complete byte, and then to check, for instance from the start and stop bits, whether an ASK10% modulation is without doubt involved.

However, if the first demodulator DEM100 first detects a blanking gap, then the second demodulator DEM10 must be deactivated immediately, since the latter demodulator, as can be seen from a comparison of FIGS. 2, 3 with FIGS. 4, 5, is entirely capable of demodulating a 100%-ASK modulation, yet because of the typically different bit coding it would produce incorrect data.

To assure function of the circuit, after a power-up, or in other words once sufficient energy has been received, both demodulators and decoders must be in operation, in order to assure proper function of the individual circuit elements. The voltage supply device SV is advantageously initially in a state which allows demodulation of a 10%-ASK modulation. In this state, it is still possible to receive a 100%-ASK modulation, but possibly only at reduced range.

I claim:

1. A data carrier, comprising:

a coil for contactless data and energy reception and for contactless data transmission;

a logic circuit connected to said coil, said logic circuit processing received, demodulated and decoded data;

a first demodulator for demodulating 100%-Amplitude Shift Keying-modulated signals received by the data carrier;

a second demodulator connected to said first demodulator for demodulating __(ASK)__-modulated signals received by the data carrier having a modulation depth of less than 100%;

said second demodulator being triggered by said first demodulator such that, on receiving a 100%-__(ASK)__-modulated signal, said second demodulator is deactivated by said first demodulator.

2. The data carrier according to claim 1, which further comprises a status register connected to said first and second demodulators through control lines, said status register indicating to said logic circuit which of said first and second demodulators is active at a given time.

3. The data carrier according to claim 2, wherein said logic circuit has a reset input, and said first demodulator has an output connected to said status register for triggering said status register, and including a switch connected between said output of said first demodulator and said reset input of said logic circuit, said switch being connected to and driven by said second demodulator.

4. A method of operating the data carrier of claim 3, which comprises deactivating the second demodulator with the first demodulator upon receiving a first blanking, and when a blanking occurs during a reception of an __(ASK)__-modulated signal with a modulation depth of less than 100%, resetting the logic circuit.

5. The method according to claim 4, which comprises adjusting a voltage supply device to optimal operation with the logic circuit as a function of a state of the status register.

6. The data carrier according to claim 1, which further comprises a voltage supply device connected through a control line to said logic circuit, said voltage supply device being adjustable optimally depending on the type of modulation of the signal being received.

7. A smart card, comprising a card body and the data carrier according to claim 1 disposed in said card body.

8. A method of operating the data carrier of claim 1, which comprises deactivating the second demodulator with the first demodulator upon receiving a first blanking, and deactivating the first demodulator with the second demodulator no earlier than after receiving a first data bit.

9. The method according to claim 8, which comprises adjusting a voltage supply device to optimal operation with the logic circuit as a function of a state of the status register.

* * * * *